US011048019B1

(12) United States Patent
Murphy et al.

(10) Patent No.: US 11,048,019 B1
(45) Date of Patent: Jun. 29, 2021

(54) WEATHER SENSOR MOUNTING SYSTEM

(71) Applicant: COMBEX, INC., Lake Geneva, WI (US)

(72) Inventors: Matthew T. Murphy, Elkhorn, WI (US); Sin Ka Hong, Hong Kong (CN); Ryan Torgerson, Burlington, WI (US)

(73) Assignee: COMBEX, INC., Lake Geneva, WI (US)

( * ) Notice: Subject to any disclaimer, the term of this patent is extended or adjusted under 35 U.S.C. 154(b) by 339 days.

(21) Appl. No.: 16/102,200

(22) Filed: Aug. 13, 2018

Related U.S. Application Data (60) Provisional application No. 62/545,959, filed on Aug. 15, 2017.

(51) Int. Cl.
| | | |
|---|---|---|
| *G01W 1/00* | (2006.01) | |
| *G01P 13/00* | (2006.01) | |
| *G01P 5/00* | (2006.01) | |
| *G01W 1/04* | (2006.01) | |
| *G01P 5/07* | (2006.01) | |
| *G01P 13/02* | (2006.01) | |

(52) U.S. Cl.
CPC ............ *G01W 1/04* (2013.01); *G01P 5/07* (2013.01); *G01P 13/02* (2013.01)

(58) Field of Classification Search
CPC .......... G01W 1/14; G01W 1/00; G01W 1/08; G01W 1/02; G01W 1/10; G01W 1/04; G01W 1/06; G01W 1/12; G01W 1/16; G01W 2001/003; G01W 2001/006; G01W 2203/00
USPC ......................................... 73/170.16–170.28
See application file for complete search history.

(56) References Cited

U.S. PATENT DOCUMENTS

| | | | | | |
|---|---|---|---|---|---|
| 3,420,101 | A | * | 1/1969 | Adams ................. | G01P 3/4802 73/170.08 |
| 4,313,345 | A | * | 2/1982 | Abele .................... | G01W 1/14 73/431 |
| 9,696,459 | B1 | * | 7/2017 | Murphy ................. | G01W 1/10 |
| 2009/0050762 | A1 | * | 2/2009 | Mallela ............... | F16M 13/022 248/278.1 |
| 2011/0174050 | A1 | * | 7/2011 | Huertos Sanz ....... | G01P 13/025 73/1.79 |
| 2012/0272726 | A1 | * | 11/2012 | Cullen .................. | G01W 1/14 73/170.21 |
| 2019/0391287 | A1 | * | 12/2019 | Meier .................... | G01P 5/02 |

FOREIGN PATENT DOCUMENTS

GB  201516320  * 10/2015 ............... G01P 5/24

OTHER PUBLICATIONS

Literature from Acurite.com "AcuRite Atlas and Acurite Atlas Elite" available at least as early as Feb. 20, 2017 (3 pages).

* cited by examiner

*Primary Examiner* — Andre J Allen
(74) *Attorney, Agent, or Firm* — Michael Best & Friedrich LLP (57) ABSTRACT

A weather sensing system mountable on a tubular member. The weather sensing system includes a weather sensor housing including removably attached first and second housing portions. The first housing portion includes a first open channel and the second housing portion including a second open channel aligned with and opening toward the first open channel. The first and second open channels form an enclosed channel for receiving and fixing the weather sensing system to the tubular member.

20 Claims, 11 Drawing Sheets

WEATHER SENSOR MOUNTING SYSTEM

BACKGROUND

The present invention relates to weather sensing systems, specifically multi-sensor weather sensing system housings mountable on supports.

Weather sensing systems often include weather sensing housings having a combination of various weather sensors for determining a variety of weather conditions such as wind direction, temperature, humidity, rainfall, and other weather parameters. Such weather sensing system housings are often mounted high up on the top of a pole or similar support away from buildings or obstructions in order to maximize the reliability of the weather data obtained. Mounting the weather sensing housing high up on top of a pole or other support may mean that the weather sensing system is located at a height that is inconvenient for both the initial installation and servicing. Furthermore, where such weather sensing housings employ mounting channels, affixing the housings at intermediate positions along the support may be prevented by obstructions on the support.

SUMMARY

In one construction, the disclosure provides a weather sensing system mountable on a support in the form of a tubular member. The weather sensing system may include a weather sensor housing including removably attached first and second housing portions. The first housing portion may include a first open channel and the second housing portion may include a second open channel aligned with and opening toward the first open channel. The first and second open channels form an enclosed channel for receiving and fixing the weather sensing system to the tubular member.

In another construction, the disclosure provides a method of mounting a weather sensing system on a support in the form of a tubular member. The method may include aligning a first weather sensor housing portion including a first open channel along the tubular member. The method may further include aligning a second weather sensor housing portion including a second open channel along the tubular member. The method would then include forming an enclosed channel from the first and the second open channels around a portion of the tubular member by engaging the first weather sensor housing portion with the second weather sensor housing portion. The method further includes fixing the second weather sensor housing portion to the tubular member in the enclosed channel. The first weather sensor housing portion and the second weather sensor housing portion may be slidably attached.

In another construction, the disclosure may provide a weather sensing system including a post and a weather sensor housing including removably attached first and second housing portions. The first housing portion may include a first open channel. The first housing portion may include one of a pair of tabs and a pair of tracks positioned on opposite sides of the first open channel. The second housing portion may include a threaded bore and a second open channel aligned with and opening toward the first open channel. The other of the pair of tabs and the pair of tracks is positioned on opposite sides of the second open channel. The first and the second open channels form an enclosed channel for receiving and fixing the weather sensing system to the post. The weather sensing system may further include a locking means including a grasping portion and a threaded shaft portion dimensioned to be received in the threaded bore of the second housing portion. The grasping portion is rotatable to advance the shaft portion to draw the pair of tabs against the pair of tracks and while engaging the shaft portion with the post.

Other aspects of the disclosure will become apparent by consideration of the detailed description and accompanying drawings.

DETAILED DESCRIPTION

It is to be understood that the disclosure is not limited in its application to the details of construction and the arrangement of components set forth in the following description or illustrated in the following drawings. The disclosure is capable of other constructions and of being practiced or of being carried out in various ways.

In any disclosed construction, the terms "substantially", "approximately", "generally", and "about" may be substituted with "within a percentage of" what is specified, where the percentage includes 0.1, 1, 5, and 10 percent. The term "slanted" is used to mean a non-zero angle or a non-parallel relationship between two components.

Figure 1:
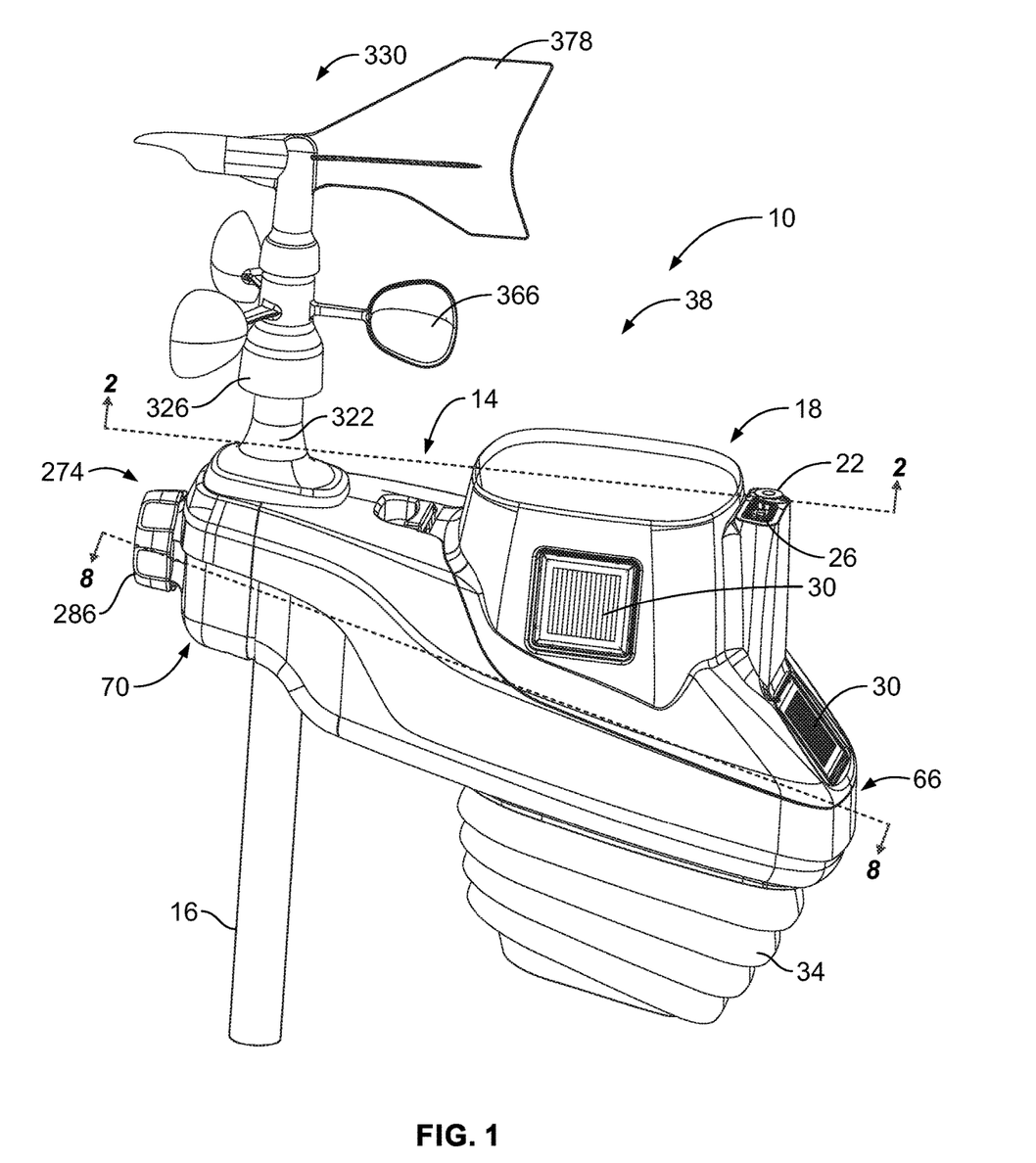
FIG. 1 is a perspective view of a mounted weather sensor housing according to some constructions.
Figure 2:
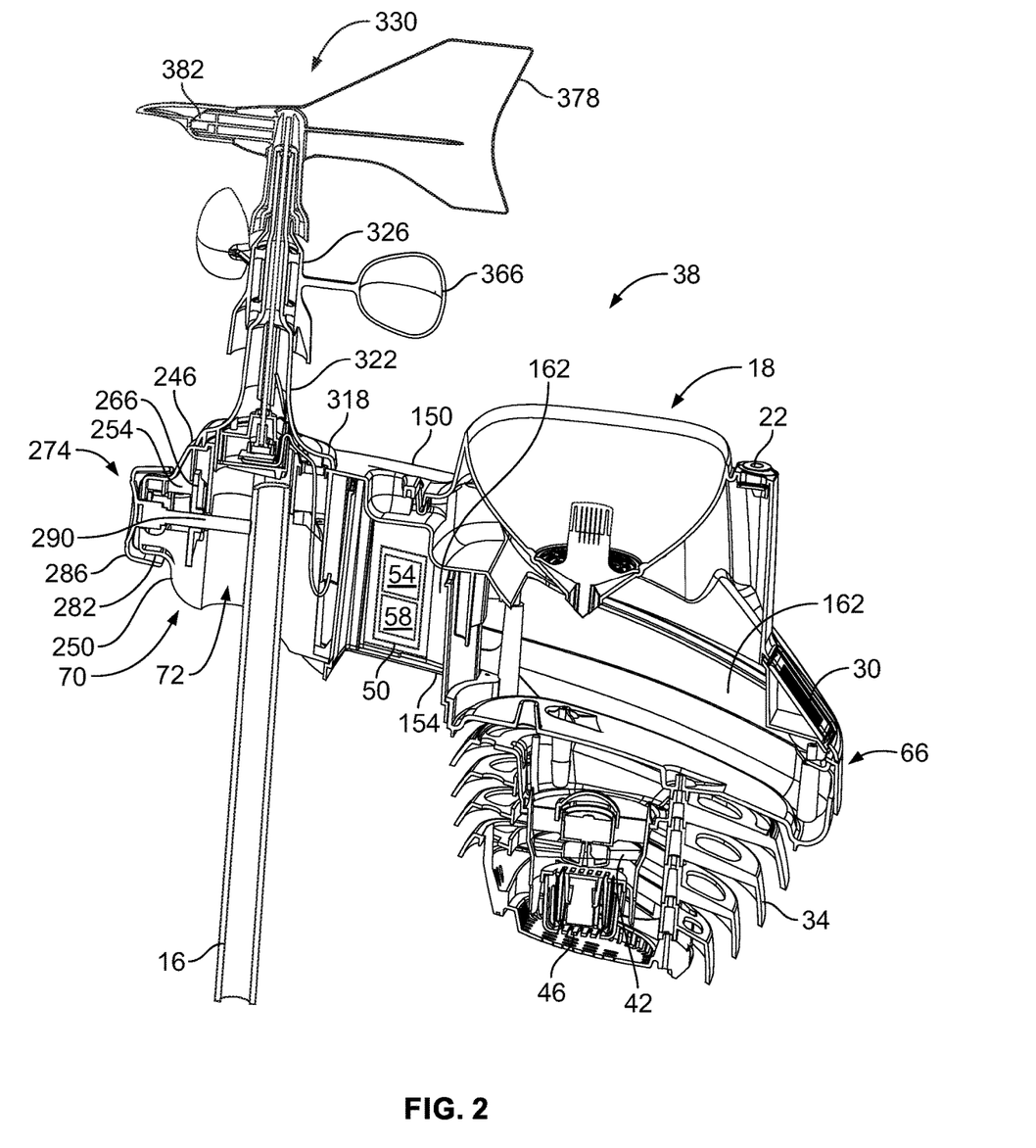
FIG. 2 is a section view of the mounted weather sensor housing of FIG. 1 taken along the lines 2-2 of FIG. 1.

FIGS. 1-2 illustrate an embodiment comprising a weather sensing system 10 including a housing 14 mountable on a generally vertical post 16. The housing 14 includes a rainwater measurement system 18, a level 22, a solar/U.V. sensor 26, a plurality of solar panels 30, a louver 34, and a wind sensing system 38. A cooling fan 42 and a temperature sensor 46 are positioned within the louver 34. A control system 50 including a processor 54 and a memory 58 is positioned within the housing 14. The plurality of solar panels 30 is in electrical communication with the control system 50 to power the control system 50. The rainwater measurement system 18, the solar/U.V. sensor 26, the wind sensing system 38, the cooling fan 42, and the temperature sensor 46 are in electrical communication with the control system 50 and are configured to transmit sensed weather data to the control system 50. The control system 50 may be in wireless or wired communication with a remote computing device (not shown) over a network to provide the sensed or measured weather data to the remote computing device.

With continued reference to FIGS. 1-2, the housing 14 includes a main housing portion 66 and a removable housing portion 70. The main housing portion 66 and the removable housing portion 70 receive a generally vertical mounting post 16 in a closed channel 72 formed therebetween.

Figure 3:
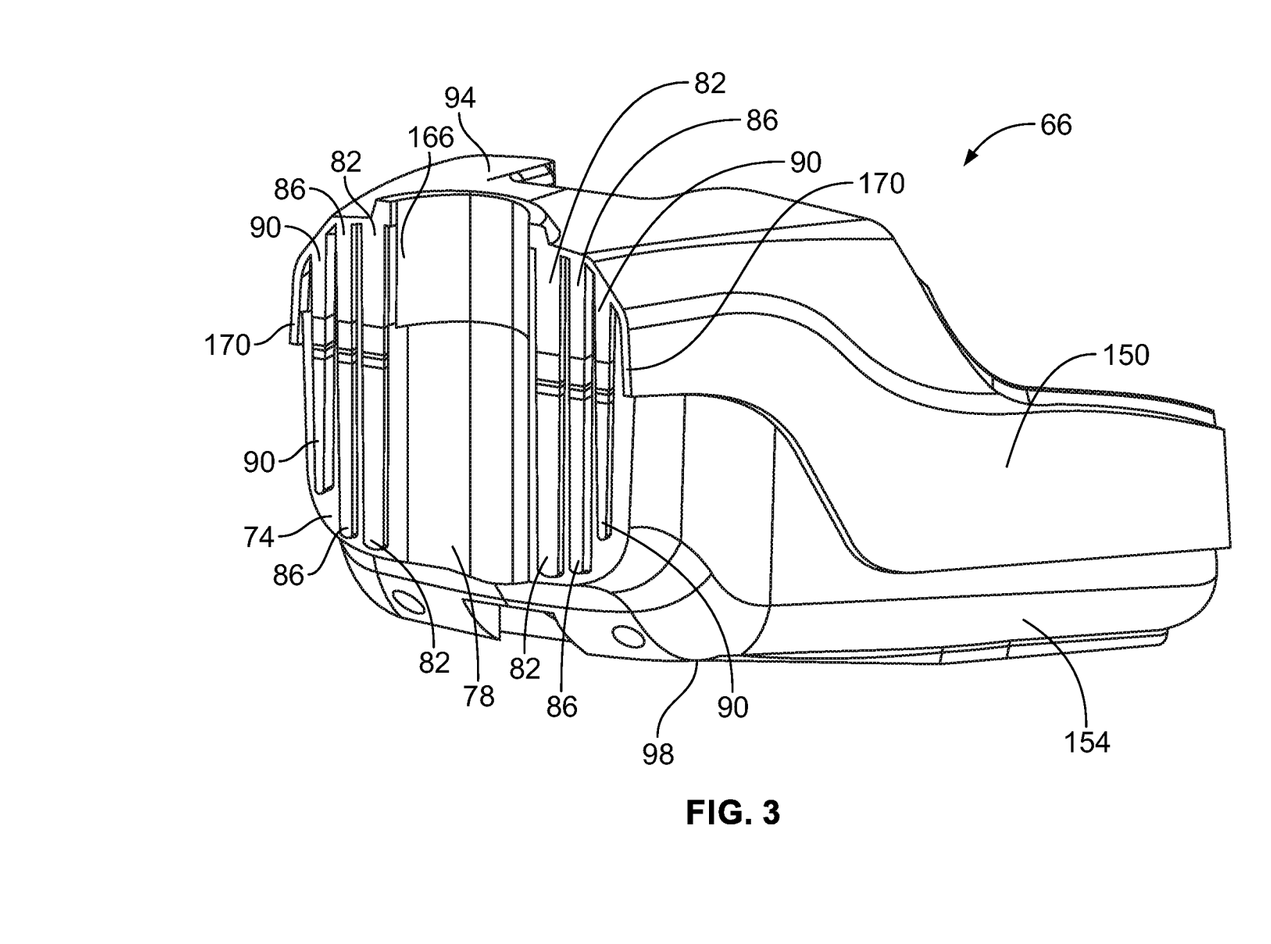
FIG. 3 is a perspective view of a main weather sensor housing portion of the weather sensor housing of FIG. 1.
Figure 4:
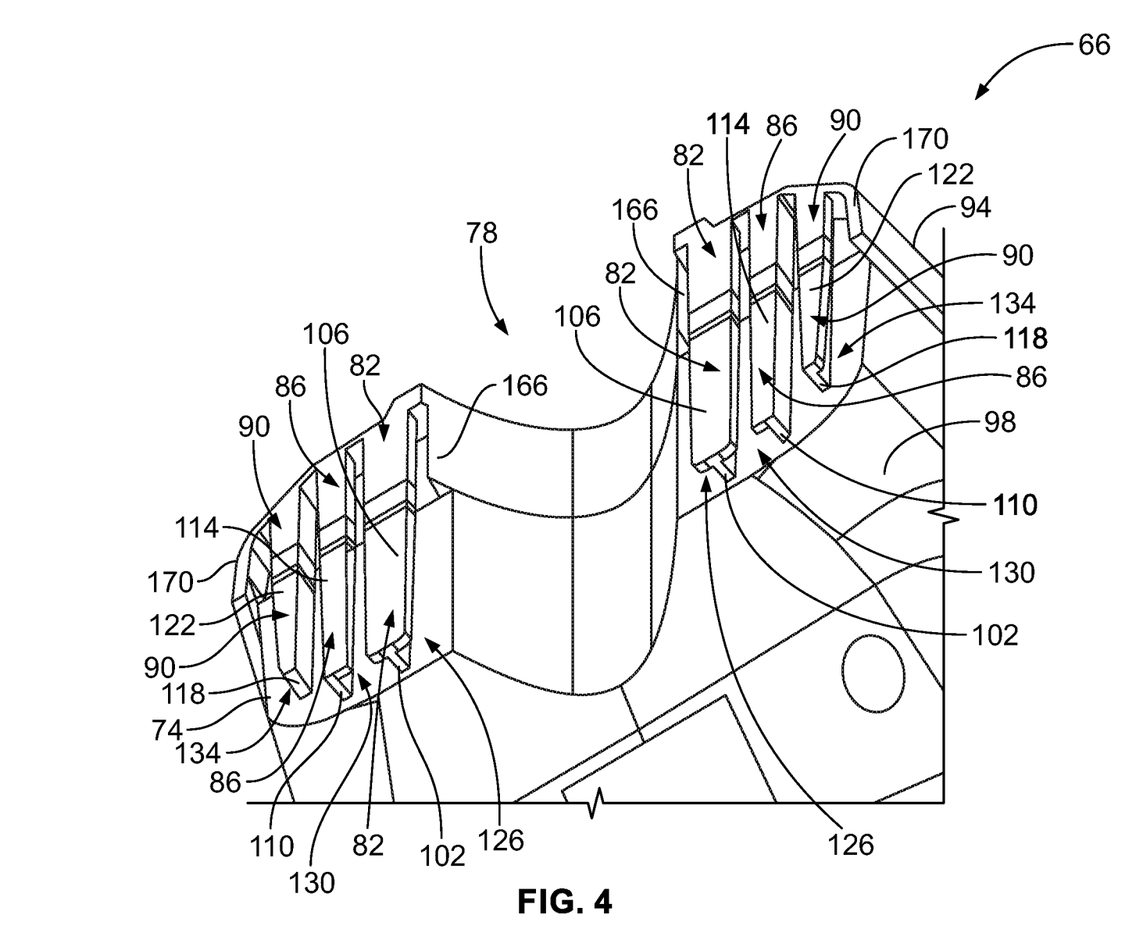
FIG. 4 is a bottom perspective view of the main weather sensor housing portion of FIG. 3.
Figure 7:
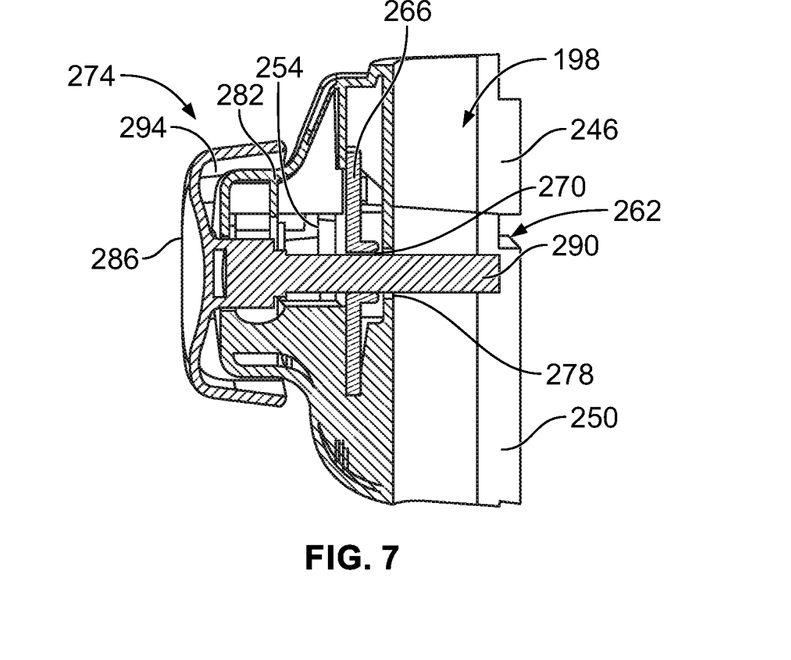
FIG. 7 is a section view of the removable weather sensor housing portion of FIG. 6. Take along the lines 7-7 of FIG. 6.

FIGS. 3 and 4 illustrate a perspective view of the main housing portion 66 with the rainwater measurement system 18, the louver 34, and the wind sensing system 38 removed. As shown in FIG. 3, an end 74 of the main housing portion 66 is substantially planar and includes an open channel 78, a first pair of tabs 82, a second pair of tabs 86, and a third pair of tabs 90. The open channel 78 is formed in the main housing portion 66 and extends between an upper surface 94 and a lower surface 98 of the main housing portion 66. In the illustrated construction, the open channel 78 is centered with respect to the end 74. As is best shown in FIGS. 4 and 7, in the illustrated construction, the open channel 78 has a conical cross-section to tightly engage vertical mounting posts 16 of different diameters. In other constructions, the open channel 78 may have a semi-circular cross-section.

With continued reference to FIGS. 3 and 4, the main housing portion 66 is substantially symmetric, so only one of each of the pairs of tabs 82, 86, and 90 will be described in detail below with the others of the pair of tabs being mirror images of tabs 82, 86 and 90. Like numerals will be used for like parts in each of the pairs of tabs 82, 86, and 90. In the illustrated construction, the first tab 82, the second tab 86, and the third tab 90 extend from the upper surface 96 of the main housing portion 66. In other constructions, the first tab 82, the second tab 86, and the third tab 90 may extend from the lower surface 98 of the main housing portion 66.

The first tab 82 is positioned proximate a side of the open channel 78 and extends substantially parallel to the open channel 78. As is best shown in FIG. 4, the first tab 82 has a substantially T-shaped cross-section formed by a stem 102 and a top portion 106. The second tab 86 is positioned proximate the first tab 82 and is substantially parallel to the first tab 82. As is best shown in FIG. 4, the second tab 86 has a substantially L-shaped cross-section formed by a stem 110 and a top portion 114. The third tab 90 is positioned proximate the second tab 86 and is substantially parallel to the second tab 86. As is best shown in FIG. 4, the third tab 90 has a substantially L-shaped cross-section formed by a stem 118 and a top portion 122. The tabs 82, 86, 90 are tapered as the tabs 82, 68, 90 approach the lower surface 98 of the main housing portion 66. In the illustrated construction, a length of the third tab 90 is shorter than a length of the first tab 82 and a length of the second tab 86. In the illustrated construction, the tabs 82, 86, and 90 are substantially parallel to the open channel 78. In other constructions, the tabs 82, 86, and 90 may be slanted with respect to the open channel 78.

As shown in FIG. 4, a first track 126 is formed between the top portion 106 and the stem 102 of the first tab 82 and the end 74 of the main housing portion 66. The first track 126 has an open side that faces toward the open channel 78. A second track 130 is formed between the top portion 106 and the stem 102 of the first tab 82, the top portion 114 and the stem 188 of the second tab 86, and the end 74 of the main housing portion 66. A longitudinal track opening is formed between the top portion 106 of the first tab 82 and the top portion 114 of the second tab 86. Due to the tapering of the first tab 82 and the second tab 86, the longitudinal track opening is wider proximate the lower surface 98 than proximate the upper surface 94. A third track 134 is formed between the top portion 122 and the stem 118 of the third tab 90 and the end 74 of the main housing portion 66. The third track 134 has an open side that faces away from the second tab 86. The first track 126, the second track 130, and the third track 134 have closed ends proximate the upper surface 94 and open ends proximate the lower surface 98. As discussed above, the main housing portion 66 is substantially symmetric, and the tracks 126, 130, and 134 are each paired with another track that is a mirror image of the respective track 126, 130, 134. Like numerals are used for like parts in each of the pairs of tracks 126, 130, and 134.

With continued reference to FIGS. 3 and 4, the main housing portion 66 includes an upper main housing portion 150 and a lower main housing portion 154 that are removably coupled to provide access to an interior cavity 162 of the main housing portion 66. The interior cavity 162 of the main housing portion 66 is dimensioned to receive the control system 50 and wiring allowing the transmission of electrical signals and power between the control system 50, the solar panels 30, and the various sensors and sensing systems of the weather sensing system 10. The upper main housing portion 150 and the lower main housing portion 154 are secured together using fasteners (not shown). The fasteners may be screws, a snap-lock system or an adhesive. The tabs 82, 86, 90 and the tracks 126, 130, 134 are formed on both the upper main housing portion 150 and the lower main housing portion 154. As shown in FIG. 4, the upper main housing portion 150 includes a fourth tab 166 extending adjacent the open channel 78. The fourth tab 166 forms a portion of the first track 126. A portion 170 of the upper surface 94 of the upper main housing portion 150 extends substantially parallel to the third tab 90. The portion 140 of the upper surface 94 of the upper main housing portion 150 forms a portion of the third track 134.

Figure 5:
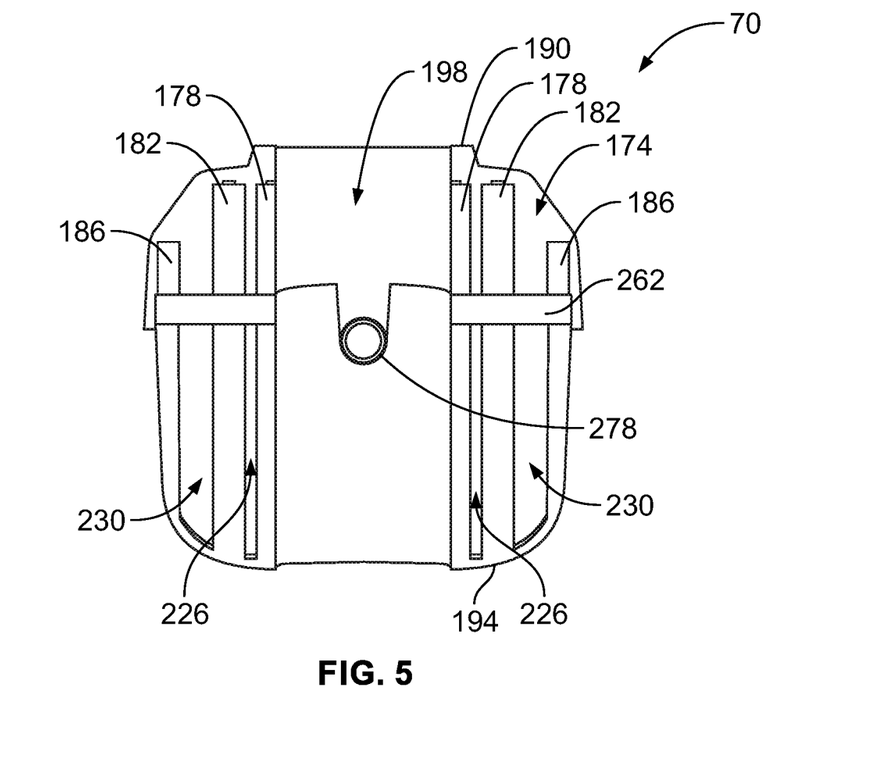
FIG. 5 is a front elevation view of a removable weather sensor housing portion of the weather sensor housing of FIG. 1.
Figure 6:
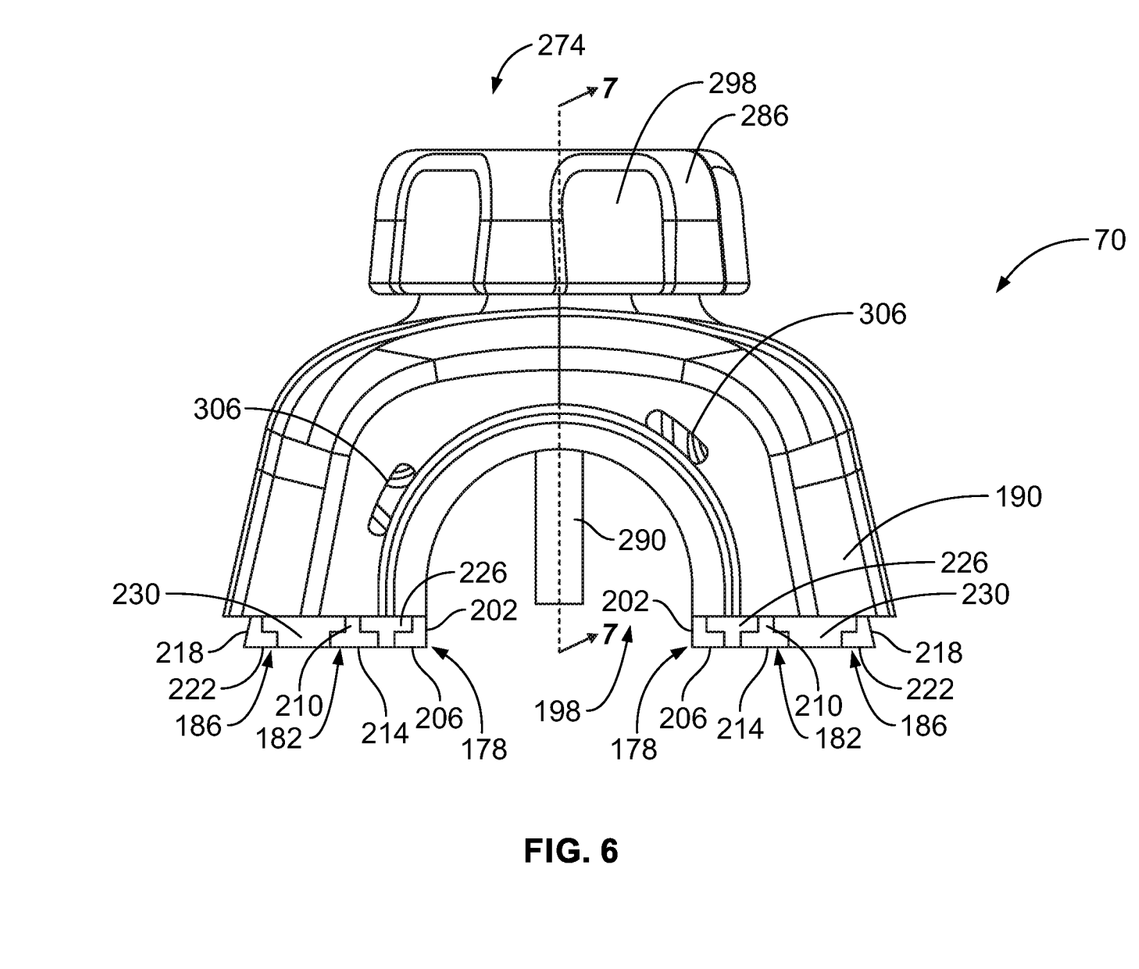
FIG. 6 is a top plan view of the removable weather sensor housing portion of FIG. 5.

FIGS. 5-7 illustrate the removable housing portion 70. As shown in FIG. 5, an end 174 of the removable housing portion 70 is substantially planar and includes an open channel 198, a first pair of tabs 178, a second pair of tabs 182, and a third pair of tabs 186. The open channel 198 is formed in the removable housing portion 70 and extends between an upper surface 190 and a lower surface 194 of the removable housing portion 70. In the illustrated construction, the open channel 198 is centered with respect to the end 174. As is best shown in FIGS. 6 and 7, in the illustrated the open channel 198 has a semi-circular cross-section.

With continued reference to FIGS. 5-7, the removable housing portion 70 is substantially symmetric, so only one of each of the pairs of tabs 178, 182, and 186 will be described in detail below with the others of the pair of tabs being mirror images of the tabs 178, 182, and 186. Like numerals will be used for like parts in each of the pairs of tabs 178, 182, and 186. In the illustrated construction, the first tab 178, the second tab 182, and the third tab 186 extend from the lower surface 194 of the removable housing portion 70. In other constructions, the first tab 178, the second tab 182, and the third tab 186 may extend from the upper surface 190 of the main housing portion 66.

The first tab 178 is positioned proximate a side of the open channel 198 and extends substantially parallel to the open channel 198. As is best shown in FIG. 6, the first tab 178 has a substantially L-shaped cross-section formed by a stem 202 and a top portion 206. The second tab 182 is positioned proximate the first tab 178 and is substantially parallel to the first tab 178. As is best shown in FIG. 6, the second tab 182 has a substantially T-shaped cross-section formed by a stem 210 and a top portion 214. The third tab 186 is positioned proximate the second tab 182 and is substantially parallel to the second tab 182. As is best shown in FIG. 6, the third tab 186 has a substantially L-shaped cross-section formed by a stem 218 and a top portion 222. The tabs 178, 182, 186 are tapered as the tabs 178, 182, 186 approach the upper surface 190 of the main housing portion 66. In the illustrated construction, a length of the third tab 186 is shorter than a length of the first tab 178 and a length of the second tab 182. In the illustrated construction, the tabs 178, 182, 186 are substantially parallel to the open channel 198. In other constructions, the tabs 178, 182, 186 may be slanted with respect to the open channel 198.

As shown in FIG. 6, a first track 226 is formed between the top portion 206 and the stem 202 of the first tab 178, the stem 210 and the top portion 214 of the second tab 182, and the end 174. A longitudinal track opening is formed between the top portion 206 of the first tab 178 and the top portion 214 and the stem 218 of the second tab 182. Due to the tapering of the first tab 178 and the second tab 182, the longitudinal track opening is wider proximate the upper surface 190 than proximate the lower surface 194. A second track 230 is formed between the top portion 214 and the stem 210 of the second tab 182, the top portion 222 and the stem 218 of the third tab 186, and the end 174. A longitudinal track opening is formed between the top portion 214 of the second tab 182 and the top portion 222 of the third tab 186. The first track 226, the second track 230, and the third track 234 have closed ends proximate the upper surface 190 and open ends proximate the lower surface 194. As discussed above, the removable housing portion 70 is substantially symmetric, and the tracks 226 and 230 are each paired with another track that is a mirror image of the respective track 226, 230. Like numerals are used for like parts in each of the pairs of tracks 226, 230.

With continued reference to FIGS. 5 and 7, the removable housing portion 70 includes an upper removable housing portion 246 and a lower removable housing portion 250 that are removably coupled to provide access to an interior cavity 254 of the removable housing portion 70. The upper removable housing portion 246 and the lower removable housing portion 250 are secured together using fasteners (not shown). The fasteners may be screws, a snap-lock system or an adhesive. The tabs 178, 182, 186 and the tracks 226, 230 are formed on both the upper removable housing portion 246 and the lower removable housing portion 250. As shown in FIG. 5, a gap 262 is formed between the portion of the tabs 178, 182, 186 and the tracks 226, 230 that is formed on the upper removable housing portion 246 and the portion of the tabs 178, 182, 186 and the tracks 226, 230 that is formed on the lower removable housing portion 250. The gap 262 is positioned to receive and act as a seat for the fourth pair of tabs 166 and the downwardly (e.g. towards the lower surface 98) extending portion 170 of the main housing portion 66.

With reference to FIG. 7, a plate 266 is positioned within the interior cavity 254 of the removable housing portion 70. The plate 266 includes a threaded bore 270 dimensioned to receive a threaded portion of a locking means 274. The threaded bore 270 is aligned with a through-opening 278 formed in the removable housing portion 70. In the illustrated construction, both the through-opening 278 and the threaded bore 270 are substantially perpendicular to the open channel 198. With continued reference to FIG. 7, a protrusion 282 is formed on the removable housing portion 70 opposite the open channel 198.

With continued reference to FIG. 7, the locking means 274 includes a graspable portion 286 and a shaft portion 290. At least a portion of the shaft portion 290 is threaded. The graspable portion 286 is substantially cylindrical and includes a cavity 294 sized to receive the protrusion 282. The graspable portion 286 and the protrusion 282 are dimensioned so that a gap is not formed between the graspable portion 286 and the protrusion 282 when the shaft portion 290 is backed out of the open channel 198. In the illustrated construction, the graspable portion 286 includes a plurality of radially spaced indentations 298 to make the graspable portion 286 easier for a user to rotate. In some constructions, the graspable portion 286 and the shaft portion 290 are integrally formed. In other constructions, the graspable portion 286 and the shaft portion 290 are formed from separate pieces. In the illustrated construction, both the plate 266 and the shaft portion 290 of the locking means 274 are made of a metal material such as aluminum or steel to provide a durable metal-to-metal threaded connection. The shaft portion 290 of the locking means 274 may extend into the closed channel 72. In the illustrated construction, the closed channel 72 is substantially teardrop shaped due to the substantially circular cross section of the open channel 198 of the removable housing portion 70 and the substantially conical cross section of the open channel 78 of the main housing portion 66.

Figure 8:
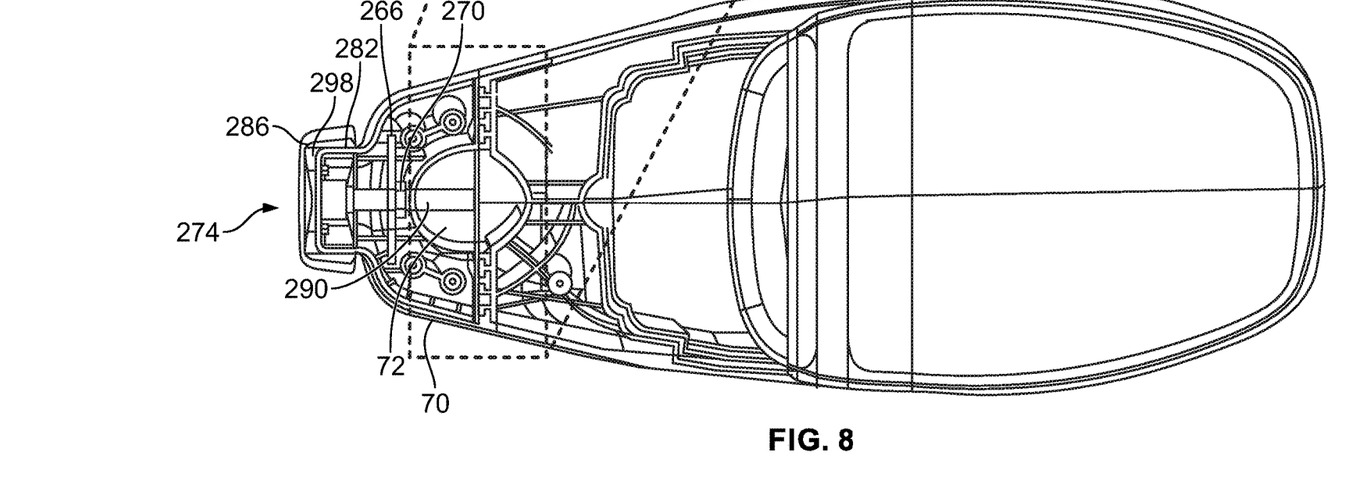
FIG. 8 is a section view of a weather sensor housing of the weather sensor of FIG. 1 taken along the lines 8-8 of FIG. 1.

As shown in FIG. 8, the removable housing portion 70 is engagable with the main housing portion 66 to cooperatively form the closed channel 72 between the open channel 198 of the removable housing portion 70 and the open channel 78 of the main housing portion 66. The cooperation of the removable housing portion 70 and the housing portion 66 to form the closed channel 72 is significant because the removability of the removable portion 70 allows the weather senor housing 14 to be positioned anywhere along a height of the generally vertical post 16, regardless of whether the generally vertical post 16 includes cross-bracing or any other obstructions that would prevent a weather sensor housing without a removable portion from being slid to the desired location along the generally vertical post 16.

Figure 8A:
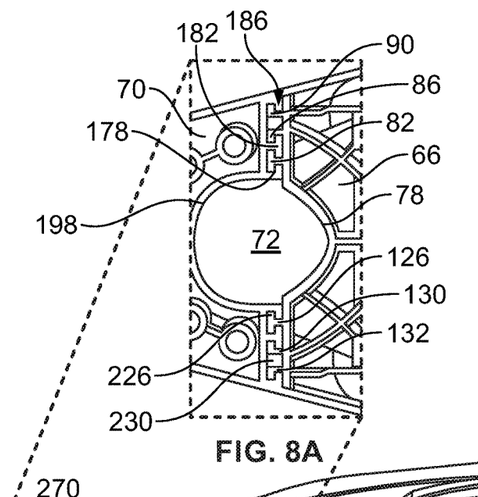
FIG. 8A is a detail view of an engagement between a main weather sensor housing portion and a removable weather sensor housing portion of the weather sensor of FIG. 1.

As is best shown in the inset of FIG. 8, when the removable housing portion 70 is engaged with the main housing portion 66, the first tab 82 of the main housing portion 66 is positioned within the first track 226 of the removable housing portion 70. The second tab 86 and the third tab 90 of the main housing portion 66 are positioned within the second track 230 of the removable housing portion 70. The first tab 178 of the removable housing portion 70 is positioned within the first track 126 of the main housing portion 66. The second tab 182 of the removable housing portion 70 is positioned within with the second track 130 of the main housing portion 66. The third tab 186 of the removable housing portion 70 is positioned within the third track 134 of the main housing portion 66.

Figure 9:
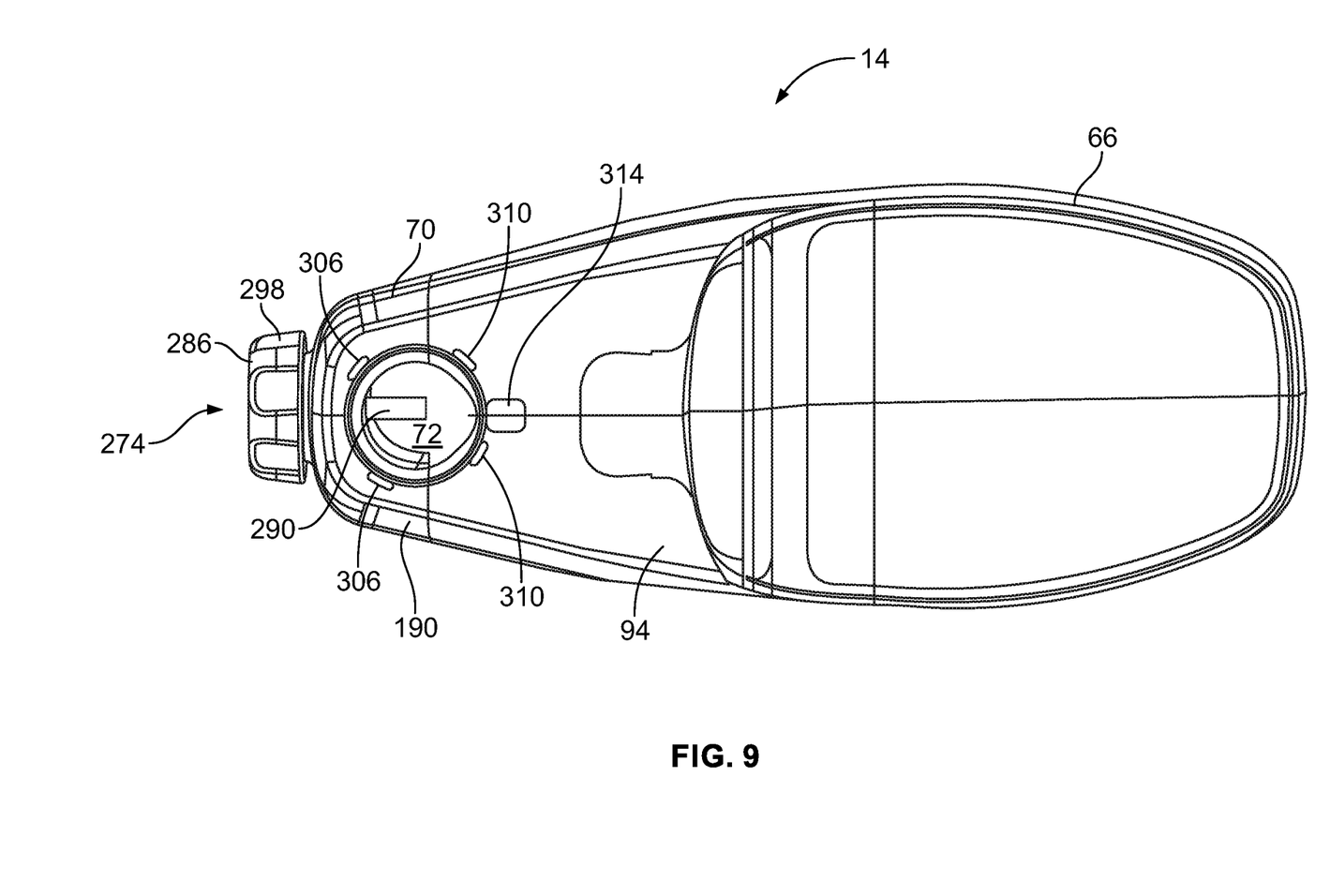
FIG. 9 is a top perspective view of the weather sensor housing of FIG. 1.

FIG. 9 shows a top view of the main housing portion 66 engaged with the removable housing portion 70. As illustrated in FIG. 9, two holes 306 are formed in the upper surface 190 the removable housing portion 70 and two holes 310 are formed in the upper surface 94 of the main housing portion 66. The holes 306 and 310 are radially positioned around the closed channel 72 and dimensioned to receive the wind sensing system 38 as is described in more detail below. The upper surface 94 of the main housing portion 66 also includes a connection portion 314 for receiving a wire 318 of the wind sensing system 38.

Figure 10:
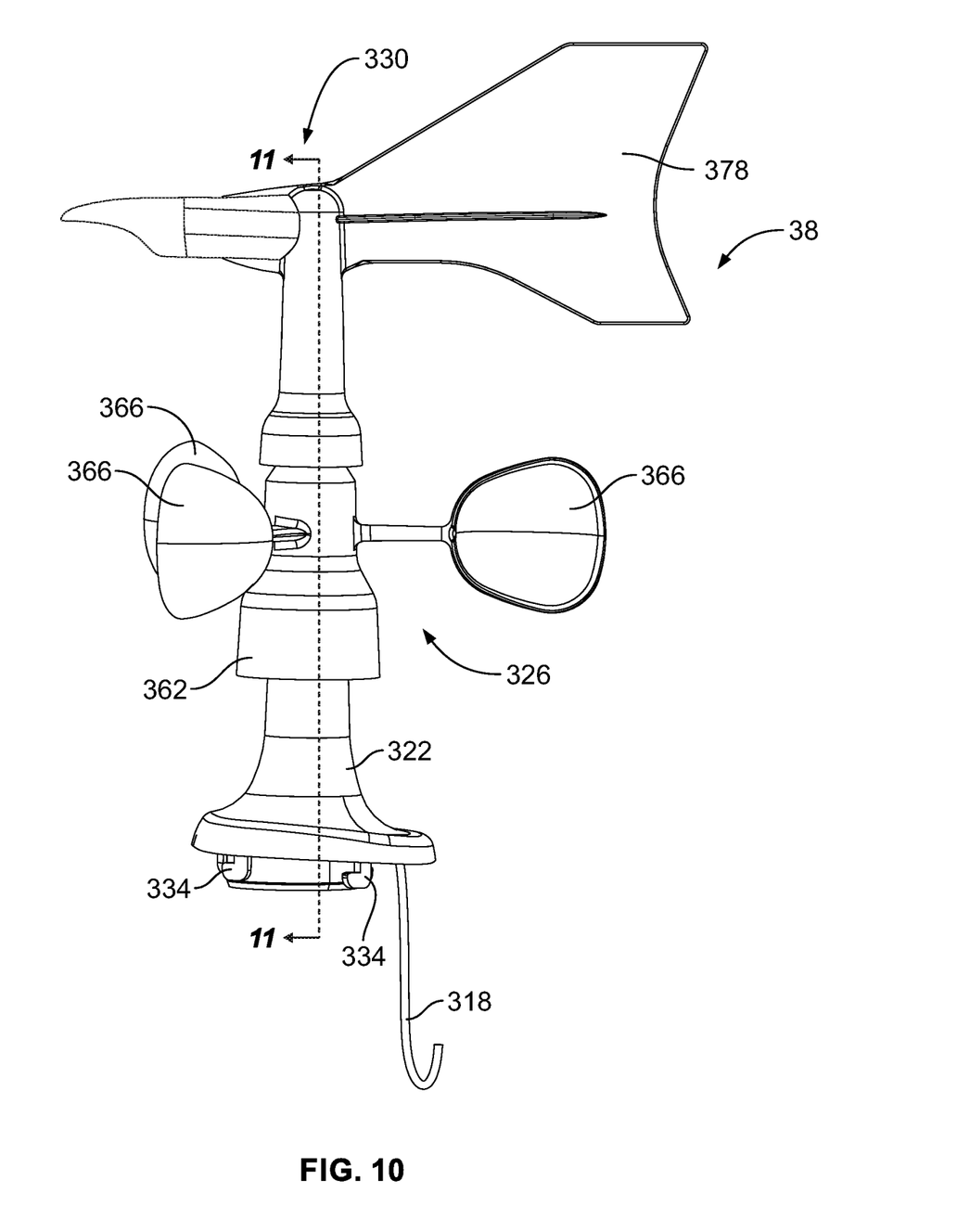
FIG. 10 is a perspective view of a wind sensing unit of the weather sensor housing of FIG. 1.
Figure 11:
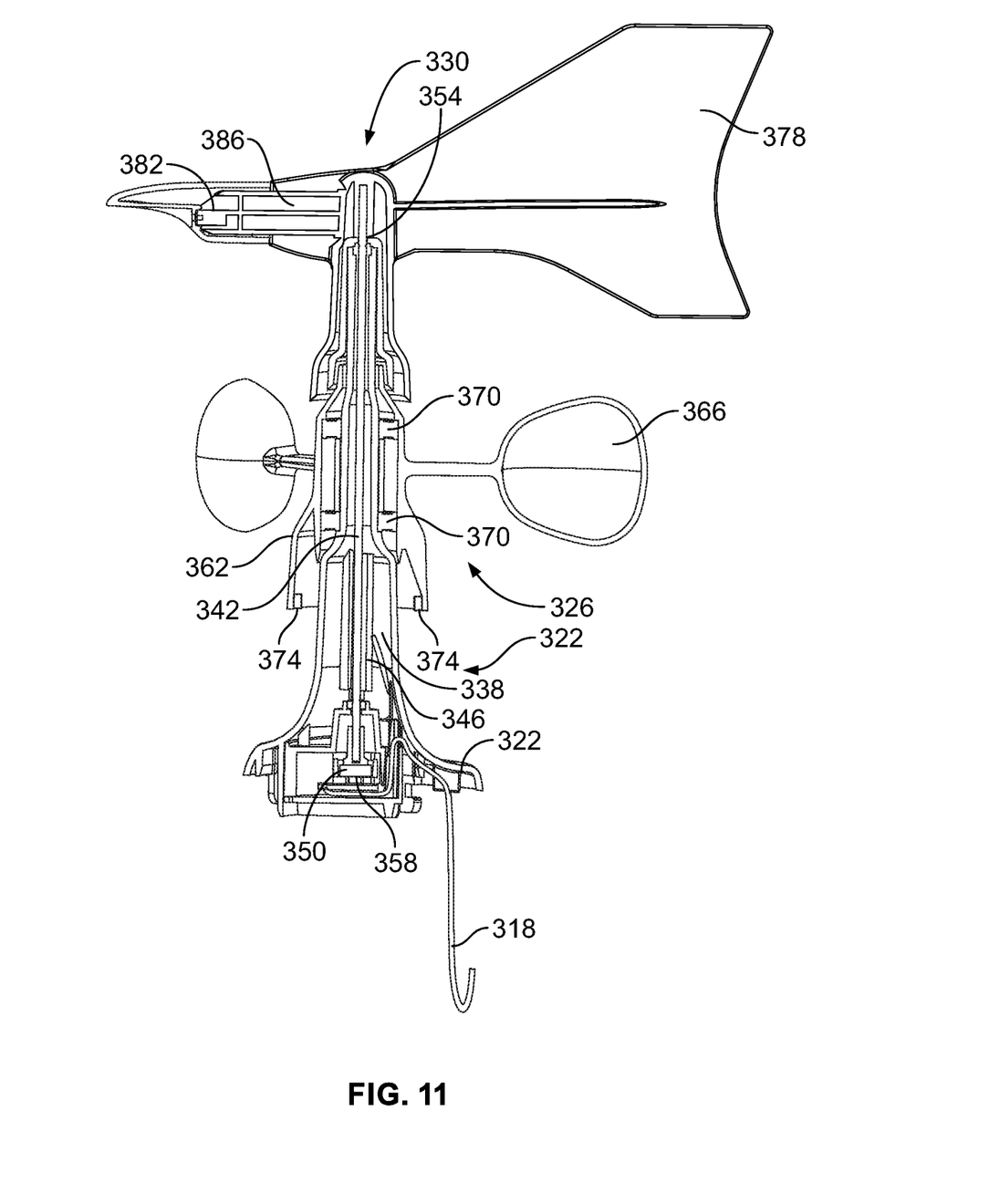
FIG. 11 is a section view of the wind sensing unit of FIG. 10 taken at lines 11-11 of FIG. 10.

FIGS. 10-11 show a wind sensing system 38 for use with the weather sensor housing 14. The wind sensing system 38 is in electrical communication with the control system 50 positioned within the main housing portion 66. The wind sensing system 38 includes a base portion 322, a rotary portion 326, and a wind direction indicator 330. The base portion 322 of the wind sensing system 38 is substantially conical and includes the wire 318, a plurality of barbs 334, and an internal cavity 338. The wire 318 is engable with the connection portion 314 of the main housing portion 66. The wire 318 facilitates electronic communication and power exchange between the control system 50 positioned within the main housing portion 66. In alternate constructions, the wind sensing system 38 may communicate wirelessly with the main housing portion 66 and may not include the wire 318. The plurality of barbs 334 is radially spaced about the base portion 322 of the wind sensing system 38. In the illustrated construction, the barbs 334 are substantially L-shaped and are dimensioned to be received within the holes 306, 310 of the weather sensor housing 14. Once the barbs 334 are received within the holes 306, 310, the wind sensing system 38 is rotatable to secure the wind sensing system 38 to the weather sensor housing 14 by forming a friction fit between the barbs 334 and the weather sensor housing 14. As is best shown in FIG. 11, the internal cavity 338 receives a rotary shaft 342, a wind speed sensor 346, a wind direction sensor 350, and the wire 318. The rotary shaft 342 extends through an opening 354 in a top end of the base portion 322. The rotary shaft 342 is positioned proximate a magnet 358. The wind direction sensor 350, which in the illustrated construction is a magnetic sensor, senses movement of the shaft 342. The wind speed sensor 346 is also positioned within the base portion 322.

As shown in FIG. 11, the rotary portion 326 includes a rotary body 362, a plurality of cups 366, and a pair of bearings 370. The plurality of cups 366 is radially spaced about the rotary body 362. The rotary body 362 is engaged with the base portion 322 of the wind sensing system 38 by the pair of bearings 370. The plurality of cups 366 open in a direction substantially perpendicular to the shaft 342 to most effectively be moved by wind. A pair of magnets 374 is embedded in the rotary body 362. In the illustrated construction, the magnets 374 are spaced 180 degrees apart to ensure that the rotary body 362 is balanced. As wind engages the plurality of cups 366, the rotary body 362 rotates with respect to the base portion 322. A speed of the wind is calculated based on the rate of rotation of the magnets 374 past the wind speed sensor 346.

With continued reference to FIGS. 10 and 11, the wind direction indicator 330 includes a sail portion 378 and a pointer portion 382. The sail portion 378 is fixedly engaged with the shaft 342 so that the shaft 342 rotates when the sail portion 378 is rotated by wind. The pointer portion 382 is engaged with the sail portion 378 and includes a plurality of weights 386 for increased stability. The pointer portion 382 points in the direction of the prevailing wind.

Figure 12:
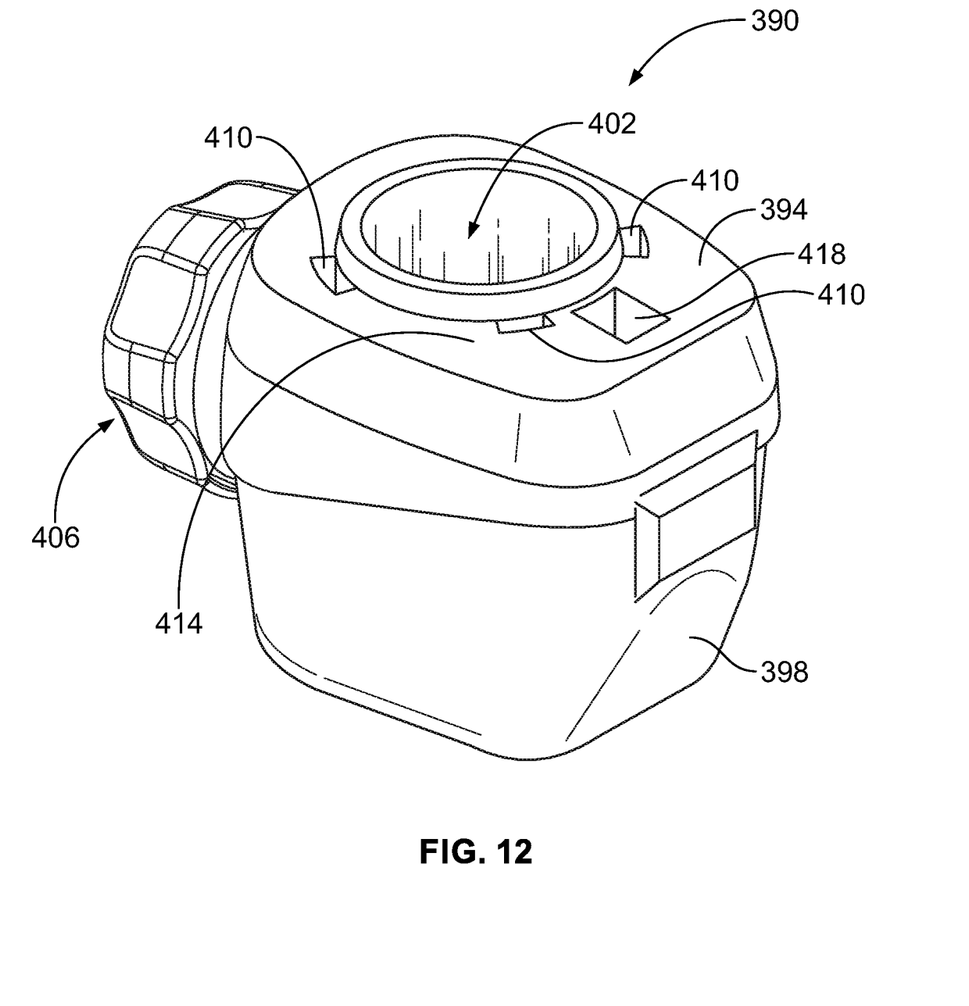
FIG. 12 is a perspective view of an auxiliary housing.

In some constructions, the wind sensor is engaged with an auxiliary housing 390. As shown in FIG. 12, the auxiliary housing 390 includes an upper auxiliary housing portion 394, a lower auxiliary housing portion 398, a closed channel 402, and a locking means 406. The upper auxiliary housing portion 394 and the lower auxiliary housing portion 398 are removably connected to provide access to an interior cavity. The auxiliary housing 390 is adapted to receive the locking means 405 in the same manner as the removable housing portion 70, and therefore is not described in detail for the sake of brevity. The locking means 406 is substantially the same as the locking means 274 and therefore is not described in detail for the sake of brevity.

As illustrated in FIG. 12, four holes 410 are formed in an upper surface 414 of the auxiliary housing 390. The holes 410 are radially positioned around the closed channel 402 and dimensioned to receive the wind sensing system 38 as is described in more detail above. The upper surface 414 of the auxiliary housing 390 also includes a connection portion 418 for receiving the wire 318 of the wind sensing system 38.

Accordingly, the weather sensing system 10 may be mounted to a top of a generally vertical pole 16 and the wind sensing system 38 may be installed to the main housing portion 14. Alternatively, the main housing 14 may be positioned at a relatively low height along the generally vertical pole 16, and the auxiliary housing may be positioned at the top of the generally vertical pole 16. In such a construction, the wind sensing system 38 is engaged with the auxiliary housing. Such a position may be advantageous because some sensors, such as the rain water measurement system 18, are more accurate at lower heights and other sensors, such as the wind sensing system 38, are more accurate at higher heights.

In operation, a user aligns the main housing portion 66 along the vertical pole 16 at a desired height and holds the main housing portion 66 so that the open channel 78 is generally parallel to the vertical pole 16. The user then aligns the removable housing portion 70 with the main housing portion 66 so that the open ends of the pairs of tracks 126, 130, 134 of the main housing portion 66 are aligned with the pairs of tabs 178, 182, 186 of the removable housing portion and the pairs of tracks 226, 230 of the removable housing portion are aligned with the pairs of tabs 82, 80, 90 of the main housing portion 66. The user then slides the removable housing portion 70 with respect to the main housing portion 66 until the removable housing portion 70 is aligned with the main housing portion 66. After the user has slid the removable housing portion 70 into engagement with the main housing portion 66, the user has encapsulated the generally vertical pole into the closed channel 72 formed between the open channel 78 of the main housing portion 66 and the open channel 198 of the removable housing portion 70. Then, holding the removable housing portion 70 and the main housing portion 66 with one hand, the user rotates the graspable portion 286 of the locking means 274 with the other hand to toollessly engage the shaft portion 290 of the locking means 274 with the generally vertical post 16. Rotation of the locking means 274 draws the generally vertical post 16 into the conical portion of the open channel 78 of the main housing portion 66 to firmly secure the weather sensor housing 14 to the generally vertical post 16. As the locking means 274 is rotated to engage the generally vertical post 16, the locking means pulls the pairs of tracks 126, 130, 134 of the main housing portion 66 into tight engagement with the pairs of tabs 178, 182, 186 of the removable housing portion and the pairs of tracks 226, 230 of the removable housing portion into tight engagement with the pairs of tabs 82, 80, 90 of the main housing portion 66.

If the weather sensor housing 14 is secured to the top of the generally vertical pole 16, the user then aligns the barbs 336 of the wind sensing system 38 with the holes 306, 310 formed in the weather sensor housing 14. The user inserts the barbs 336 into the holes 306, 310 and twists the wind sensing system 38 with respect to the weather sensor housing 14 to secure the wind sensing system 38 to the weather sensor housing 14.

If the weather sensor housing 14 is not secured to the top of the generally vertical pole 16, the auxiliary housing 390 is positioned above the top of the generally vertical pole 16 and the closed channel 402 is aligned with the top of the generally vertical pole 16. The auxiliary housing 390 is then slid with respect to the generally vertical pole 16 so that the generally vertical pole 16 is received within the closed channel 402. The user then rotates the locking means 406 to secure the auxiliary housing to the generally vertical pole 16. The user then aligns the barbs 336 of the wind sensing system 38 with the holes 306, 310 formed in the weather sensor housing 14. The user inserts the barbs 336 into the holes 306, 310 and twists the wind sensing system 38 with respect to the weather sensor housing 14 to secure the wind sensing system 38 to the weather sensor housing 14.

Various features and advantages of embodiments of the disclosure are set forth in the following claims.

What is claimed is:

1. A weather sensing system mountable on a support comprising:
    a weather sensor housing including removably attached first and second housing portions,
    the first housing portion including a first open channel and the second housing portion including a second open channel aligned with and opening toward the first open channel, where the first and second open channels form an enclosed channel for receiving and fixing the weather sensing system to the support.

2. The weather sensing system of claim 1, wherein the weather sensor housing includes:
    a pair of tabs positioned on opposite sides of one of the first open channel and the second open channel, and
    a pair of tracks for slidably receiving the pair of tabs positioned on opposite sides of the other of the first open channel and the second open channel.

3. The weather sensing system of claim 2, further comprising locking means including a grasping portion and a threaded shaft portion dimensioned to be received in a threaded bore of the second housing portion, the grasping portion rotatable to advance the shaft portion to press against the support to draw the pair of tabs away from the support and against the pair of tracks thereby securing the second housing portion to the first housing portion.

4. The weather sensing system of claim 3, wherein a locking tab extends across one of the pair of tabs and the pair of tracks and a locking track for receiving the locking tab extends across the other of the pair of tabs and the pair of tracks, the locking tab engageable with the locking track to fix the second housing portion to the first housing portion.

5. The weather sensing system of claim 1, wherein the weather sensor housing includes:
    a first tab and a first track positioned on opposite sides of the first open channel;
    a second tab and a second track positioned on opposite sides of the second open channel; and
    the first track and the second track slidingly receiving the first tab and the second tab.

6. The weather sensing system of claim 5, further comprising locking means including a grasping portion and a threaded shaft portion dimensioned to be received in a threaded bore of the second housing portion, the grasping portion rotatable to advance the shaft portion to press against the support to draw the first tab and the second tab against the first track and the second track to secure the second housing portion to the first housing portion.

7. The weather sensing system of claim 6, wherein a locking tab extends across one of the first tab and the first track and the second tab and the second track, and a locking track for receiving the locking tab extends across the other of the first tab and the first track and the second tab and the second track, the locking tab engageable with the locking track to fix the second housing portion to the first housing portion.

8. The weather sensing system of claim 1, further comprising a controller positioned in the weather sensor housing in electrical communication with a wind sensing unit removably coupled to the weather sensor housing, and wherein the weather sensor housing includes at least one weather sensor comprising at least one of a temperature sensor, a light sensor, or a rainwater sensor.

9. The weather system of claim 1, further comprising an auxiliary housing including a channel for receiving and fixing the auxiliary housing to the support at a height spaced from and above the weather sensing housing, and wherein the wind sensing unit is removably couplable to the auxiliary housing.

10. A method of mounting a weather sensing system on a tubular member comprising:
    aligning a first weather sensor housing portion including a first open channel along the tubular member;
    aligning a second weather sensor housing portion including a second open channel along the tubular member;
    forming an enclosed channel from the first and the second open channels around a portion of the tubular member by slidably engaging the first weather sensor housing portion with the second weather sensor housing portion; and
    fixing the second weather sensor housing portion to the tubular member in the enclosed channel.

11. The method of claim 10, further comprising the steps of aligning a pair of tabs positioned on opposite sides of one of the first open channel and the second open channel with a pair of tracks positioned on opposite sides of the other of the first open channel and the second open channel, and sliding the pair of tabs into engagement with the pair of tracks.

12. The method of claim 11, further comprising the steps of:
    grasping a grasping portion of a locking means;
    engaging a threaded shaft portion of the locking means with a threaded bore of the second weather sensor housing portion; and
    advancing the shaft portion of the locking means to press against the tubular member to draw the pair of tabs away from the tubular member and against the pair of tracks thereby securing the second housing portion to the first housing portion.

13. The method of claim 12, further comprising the step of drawing a locking tab extending across one of the pair of tabs and the pair of tracks into engagement with a locking track for receiving the locking tab extending across the other of the pair of tabs and the pair of tracks to fix the second housing portion to the first housing portion.

14. The method of claim 10, further comprising the steps of aligning a first tab and a first track on opposite sides of the first open channel with a second tab and a second track on opposite sides of the second open channel, and sliding the first tab and the second tab into engagement with the first track and the second track.

15. The method of claim 14, further comprising the steps of:
    grasping a grasping portion of a locking means;
    engaging a threaded shaft portion of the locking means with a threaded bore of the second weather sensor housing portion;
    and advancing the shaft portion of the locking means to engage the tubular member while drawing the first tab and the second tab into engagement with the first track and the second track to secure the second housing portion to the first housing portion.

16. The method of claim 15, further comprising the step of drawing a locking tab extending across one of the first tab and the first track and the second tab and the second track into engagement with a locking track for receiving the locking tab extending across the other of the first tab and the first track and the second tab and the second track to fix the second housing portion to the first housing portion.

17. The weather sensing system of claim 10, wherein the first weather sensor housing portion includes at least one weather sensor comprising one or more of a temperature sensor, a light sensor, a wind sensor, or a rainwater sensor.

18. A weather sensing system comprising:
   a post;
   a weather sensor housing including removably attached first and second housing portions,
      the first housing portion including a first open channel, the first housing portion including one of a pair of tabs and a pair of tracks positioned on opposite sides of the first open channel,
      the second housing portion including a threaded bore and a second open channel aligned with and opening toward the first open channel, the other of the pair of tabs and the pair of tracks positioned on opposite sides of the second open channel, where the first and the second open channels form an enclosed channel for receiving and fixing the weather sensing system to the post;
   a locking means including a grasping portion and a threaded shaft portion dimensioned to be received in the threaded bore of the second housing portion, the grasping portion rotatable to advance the shaft portion to draw the pair of tabs against the pair of tracks and to engage the shaft portion with the post.

19. The weather sensing system of claim 18, wherein the post is a vertical post configured to support the weather sensing system.

20. The weather sensing system of claim 18, wherein a locking tab extends across one of the pair of tabs and the pair of tracks and a locking track for receiving the locking tab extends across the other of the pair of tabs and the pair of tracks, the locking tab engageable with the locking track to fix the second housing portion to the first housing portion.

* * * * *